(12) United States Patent
Hyun et al.

(10) Patent No.: US 9,251,053 B2
(45) Date of Patent: Feb. 2, 2016

(54) MANAGING CONFIGURATION PARAMETERS FOR A NON-VOLATILE MEDIUM

(71) Applicant: Fusion-io, Inc., Salt Lake City, UT (US)

(72) Inventors: Jea Hyun, South Jordan, UT (US); Robert Wood, Niwot, CO (US); Hairong Sun, Superior, CO (US)

(73) Assignee: SanDisk Technologies, Inc., Plano, TX (US)

( * ) Notice: Subject to any disclaimer, the term of this patent is extended or adjusted under 35 U.S.C. 154(b) by 236 days.

(21) Appl. No.: 13/830,989

(22) Filed: Mar. 14, 2013

(65) Prior Publication Data

US 2014/0281119 A1 Sep. 18, 2014

(51) Int. Cl.
*G06F 12/00* (2006.01)
*G06F 12/02* (2006.01)
*G06F 12/06* (2006.01)

(52) U.S. Cl.
CPC ........ *G06F 12/0238* (2013.01); *G06F 12/0646* (2013.01); *G06F 2212/7203* (2013.01); *G06F 2212/7206* (2013.01); *G06F 2212/7207* (2013.01)

(58) Field of Classification Search
CPC ............ G06F 12/0238; G06F 12/0646; G06F 2212/7203; G06F 2212/7206
See application file for complete search history.

(56) References Cited

U.S. PATENT DOCUMENTS

| | | | |
|---|---|---|---|
| 6,851,018 B2 * | 2/2005 | Wyatt et al. | 711/111 |
| 6,871,257 B2 | 3/2005 | Conley et al. | |
| 2006/0253644 A1 * | 11/2006 | Surico et al. | 711/103 |
| 2008/0263262 A1 * | 10/2008 | Sokolov et al. | 711/100 |
| 2009/0013128 A1 * | 1/2009 | Peterson | 711/113 |
| 2010/0161854 A1 * | 6/2010 | Schwarz et al. | 710/39 |
| 2010/0185812 A1 * | 7/2010 | Kim | 711/109 |

* cited by examiner

*Primary Examiner* — Aracelis Ruiz
(74) *Attorney, Agent, or Firm* — Kunzler Law Group, PC

(57) ABSTRACT

An apparatus, system, and method are disclosed for managing configuration parameters of a non-volatile storage device. The method includes storing a first set of configuration parameters for a non-volatile recording device. The first set of configuration parameters are configured for a storage operation on a storage element of the non-volatile recording device. The method also includes storing a second set of configuration parameters for the non-volatile recording device during execution of the storage operation on the storage element. The second set of configuration parameters are configured for a second storage operation on the storage element of the non-volatile recording device.

23 Claims, 11 Drawing Sheets

MANAGING CONFIGURATION PARAMETERS FOR A NON-VOLATILE MEDIUM

TECHNICAL FIELD

The present disclosure, in various embodiments, relates to configuration parameters and more particularly relates to managing configuration parameters for a non-volatile medium.

BACKGROUND

Configuration parameters may be used to manage various properties of a storage device. Configuration parameters often may be set during operation of the storage device. However, a storage device may take time to set individual parameters. When many parameters are being set, the aggregated time to set each individual parameter may form a significant delay.

There are several scenarios where multiple configuration parameters may be set for a storage device, even for a single storage operation. For example, properties of a storage device, such as stored values, read voltage levels, resistivity, or the like, can shift over time due to storage cell damage, storage cell leakage, temperature, or other disturbances that alter the state of the storage cells. Therefore, to counter or rectify such disturbances, customized configuration parameters may be used for a storage operation, such as customized read voltage thresholds or the like. However, setting different configuration parameters per storage operation may have a negative impact on performance, due to the delay described above.

SUMMARY

Methods are presented for managing configuration parameters. In one embodiment, a method includes storing a first set of configuration parameters to a non-volatile recording device, where the first set of configuration parameters is for a storage operation on a storage element of the non-volatile recording device. In a further embodiment, a method includes, storing a second set of configuration parameters to a non-volatile recording device during execution of a storage operation on the storage element. In one embodiment, a second set of configuration parameters are for a second storage operation on a storage element of a non-volatile recording device.

Apparatuses are presented for managing configuration parameters. In one embodiment, an apparatus includes a first buffer configured to receive configuration parameters for a storage operation on a non-volatile memory element. An apparatus, in a further embodiment, includes a second buffer configured to receive configuration parameters while a non-volatile memory element is performing a storage operation. In one embodiment, a storage operation is based on configuration parameters from a first buffer.

Apparatuses are presented for managing configuration parameters. An apparatus, in one embodiment, includes a controller and a non-volatile memory device. In this embodiment, the non-volatile memory device includes a non-volatile storage medium, a plurality of registers, a configuration module, and an execution module. In a further embodiment, the configuration module is configured to receive sets of configuration parameters from the controller and store the sets in the plurality of registers. In another embodiment, the execution module is configured to execute storage operations on the non-volatile storage device based on the stored sets of configuration parameters while the configuration module is receiving the sets of configuration parameters.

A computer program product is presented for managing configuration parameters. The product includes a computer readable storage medium storing computer usable code executable to perform operations for managing configuration parameters. In one embodiment, the operations include receiving a set of configuration parameters, the set of parameters defining execution of a storage operation on a non-volatile recording device. The operations, in another embodiment, include executing the storage operation on the non-volatile recording device. The operations, in a further embodiment, include receiving one or more additional sets of configuration parameters during execution of the storage operation on the non-volatile recording device. In one embodiment, the additional sets of configuration parameters are for defining additional storage operations on the non-volatile recording device.

Another apparatus is presented for managing configuration parameters. In one embodiment, the apparatus includes means for writing a set of configuration parameters to a non-volatile memory element, the set of configuration parameters defining a storage operation on the non-volatile memory element. The apparatus, in another embodiment, includes means for causing the storage operation to be executed on the non-volatile memory element. In a further embodiment, the apparatus includes means for writing one or more additional sets of configuration parameters to the non-volatile memory element during execution of the storage operation on the non-volatile memory element. In a further embodiment, the one or more additional sets of configuration parameters are for defining one or more additional storage operations on the non-volatile memory element.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
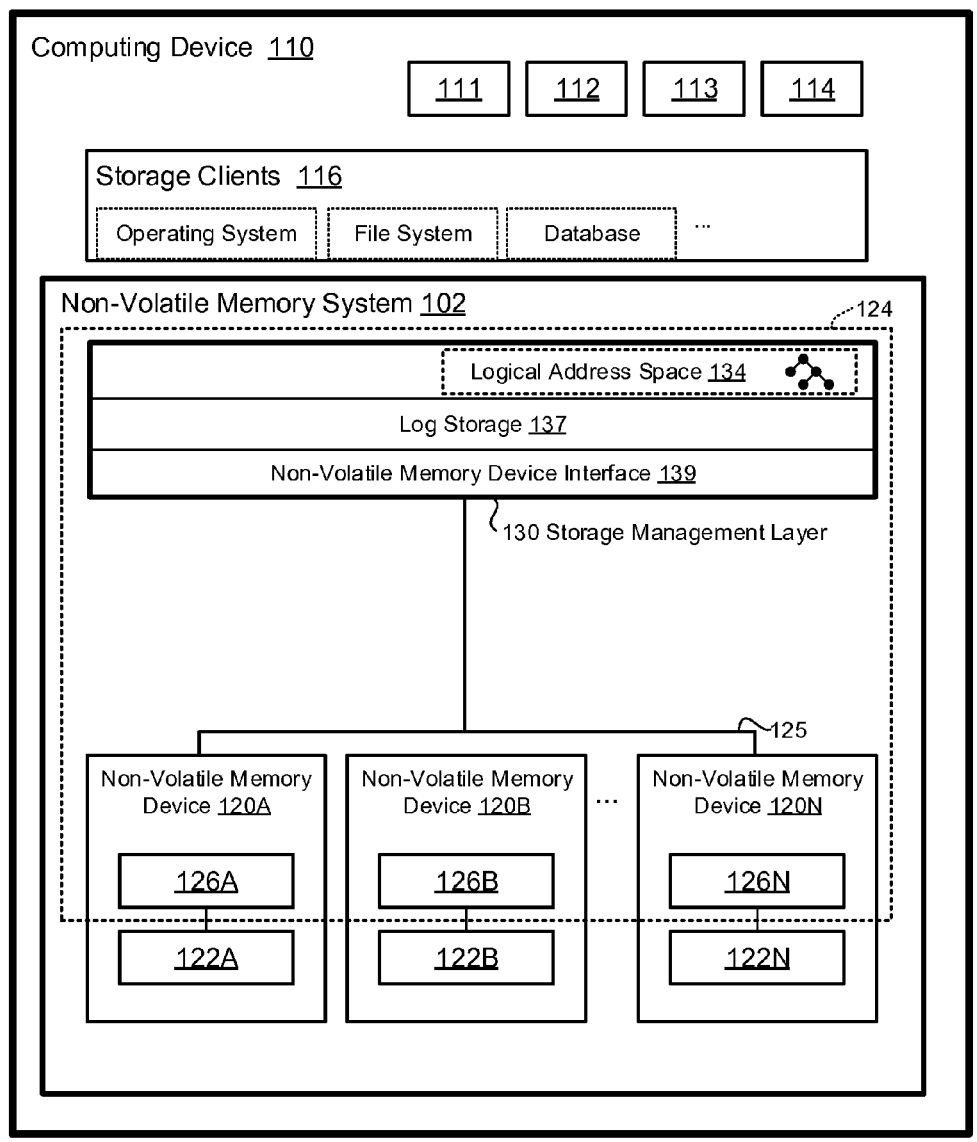
FIG. 1A is a schematic block diagram of one embodiment of a non-volatile memory system.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer (SML), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML may maintain metadata, such as a forward index, to map logical addresses of the logical address space to media storage locations on the non-volatile memory device(s). The SML may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising 2^32 unique logical addresses, each referencing 2048 bytes (or 2 Kibibytes) of data may be 2^43 bytes (As used herein, a Kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media, a memory division index, or the like).

In some embodiments, the contextual data format may allow data context to be determined (and/or reconstructed) based upon the contents of the non-volatile memory media, and independently of other metadata, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory media may allow data context to be determined without reference to other metadata. For example, the contextual data format may allow the metadata to be reconstructed based only upon the contents of the non-volatile memory media (e.g., reconstruct the any-to-any mappings between logical addresses and media locations).

The read voltage levels of storage cells, and other configuration parameters, can also shift over time, due to leakage and other disturbances of the non-volatile memory media 110. The rate of leakage can also increase with the wear and age of a non-volatile memory media. If the read voltage level of a storage cell shifts past the read voltage threshold, a data error may occur, as the value of the data read from the storage cell is different than the value of the data written to the storage cell.

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory media, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory media. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a log format. As described above, a log format refers to a data format that defines an ordered sequence of storage operations performed on a non-volatile memory media. In some embodiments, the log format comprises storing data in a pre-determined sequence of media addresses of the non-volatile memory media (e.g., within sequential pages and/or erase blocks of the media). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller may maintain a current append point at a media address of the non-volatile memory device. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media, and independently of other metadata. As discussed above, invalid data may not be removed from the non-volatile memory media until the memory division comprising the data is reclaimed. Therefore, multiple "versions" of data having the same context may exist on the non-volatile memory media (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A is a block diagram of one embodiment of a system 100 comprising a non-volatile memory controller 124. The non-volatile memory controller 124 may be part of and/or in communication with a storage management layer (SML) 130. The SML 130 may operate on a non-volatile memory system 102 of a host computing device 110, which may comprise a processor 111, volatile memory 112, and a communication interface 113. The processor 111 may comprise one or more central processing units, one or more general-purpose processors, one or more application-specific processors, one or more virtual processors (e.g., the host computing device 110 may be a virtual machine operating within a host), one or more processor cores, or the like. The communication interface 113 may comprise one or more network interfaces configured to communicatively couple the host computing device 110 (and/or non-volatile memory controller 124) to a communication network, such as an Internet Protocol network, a Storage Area Network, or the like.

The host computing device 110 may further comprise a non-transitory, computer readable storage media 114. The computer readable storage media 114 may comprise executable instructions configured to cause the host computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the host computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

Figure 1B:
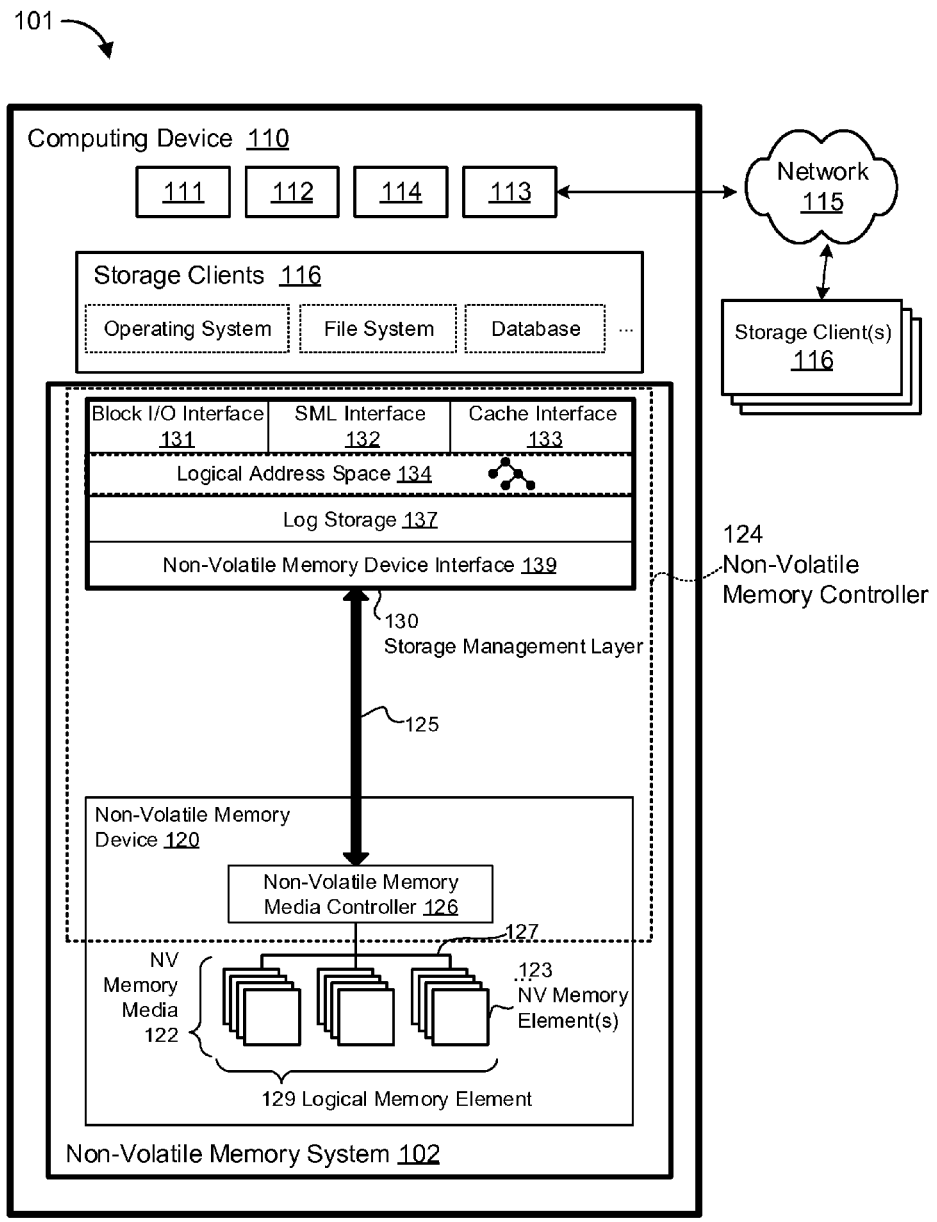
FIG. 1B is a schematic block diagram of another embodiment of a non-volatile memory system.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block I/O interface 131. Additionally, the SML 130 may provide access to enhanced functionality (large, virtual address space) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network, Infiniband, SCSI RDMA, or the like. The non-volatile memory device interface 139 may communicate with the non-volatile memory devices 120A-N using input-output control (IO-CTL) command(s), IO-CTL command extension(s), remote direct memory access, or the like.

The non-volatile memory system 102, in the depicted embodiment, includes a non-volatile memory controller 124. Additionally, in the depicted embodiment, the non-volatile memory devices 120A-N may include control registers or other memory buffers for storing sets of configuration parameters. A memory buffer, as used herein, comprises storage or memory located on a non-volatile memory device 120 that is accessible to the non-volatile memory controller 124, the host computing device 110, a storage client 116, or the like for storing settings, instructions, or other configuration parameters for a non-volatile memory element 123. A memory buffer may be volatile or non-volatile. In certain embodiments, a memory buffer comprises a data register (e.g., a control register) of a predefined size (e.g., 1 bit, 8 bit, 32 bit, 64 bit, integer register, floating point register, or the like) for a specific setting, instruction, or other configuration parameter. A memory buffer or register may comprise an array of memory cells such as bi-stable flip-flops (e.g., D flip-flops, T flip-flops, JK flip-flops, or the like) or latches (e.g., SR NOR latches, SR NAND latches, JK latches, D latches, Earle latches, or the like), or other volatile or non-volatile memory cells.

In one embodiment, a non-volatile memory element 123 comprises a plurality of embedded memory buffers co-located with non-volatile memory media 122 within an integrated circuit device, chip, package, die, die plane, or the like of the non-volatile memory element 123 for storing settings, instructions, or other configuration parameters for the non-volatile memory element 123. Memory buffers may be accessible to an embedded controller or media manager of the non-volatile memory element 123.

The non-volatile memory controller 124, in one embodiment, is configured to write a set of configuration parameters to a memory buffer of the non-volatile memory devices 120A-N for a storage operation, and write another set of configuration parameters to another memory buffer during execution of the storage operation. This may allow a non-volatile memory device 120 to execute multiple storage operations without waiting for configuration parameters between storage operations.

In one embodiment, the non-volatile memory controller 124 may comprise executable software code, such as a device driver, SML 130, or the like, stored on the computer readable storage media 114 for execution on the processor 111. In another embodiment the non-volatile memory controller 124 may comprise logic hardware of one or more of the non-volatile memory devices 120A-N, such as a non-volatile memory media controller 126A-N, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the non-volatile memory controller 124 may include a combination of both executable software code and logic hardware.

In one embodiment, the non-volatile memory controller 124 is configured to receive storage requests from the SML 130 via a bus 125 or the like. The non-volatile memory controller 124 may be further configured to transfer data to/from the SML 130 and/or storage clients 116 via the bus 125. Accordingly, the non-volatile memory controller 124, in some embodiments, may comprise and/or be in communication with one or more direct memory access (DMA) modules, remote DMA modules, bus controllers, bridges, buffers, and so on to facilitate the transfer of storage requests and associated data. In another embodiment, the non-volatile memory controller 124 may receive storage requests as an API call from a storage client 116, as an IO-CTL command, or the like.

FIG. 1B is a block diagram of another embodiment of a system 101 comprising a non-volatile memory controller 124. As described above, the non-volatile memory controller 124 may be part of and/or in communication with a storage management layer 130. The SML 130 may operate on a non-volatile memory system 102 of a host computing device 110, which, as discussed above, may comprise a processor 111, volatile memory 112, communication interface 113, and non-transitory, computer readable storage media 114. The communication interface 113 may comprise one or more network interfaces configured to communicatively couple the host computing device 110 (and/or non-volatile memory controller 124) to a network 115 and/or to one or more remote, network-accessible storage clients 116.

The host computing device 110 may comprise a non-volatile memory controller 124 that is configured to provide storage services to the storage clients 116. The storage clients 116 may include local storage clients 116 operating on the host computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like.

Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, die, die planes, and the like. The non-volatile memory elements 123, in certain embodiments, may comprise non-volatile storage elements, non-volatile recording elements, or the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

The non-volatile memory system 102 may be configured to use sets of configuration parameters for storage operations. For example, in an embodiment where the non-volatile memory media 122 includes multi-level storage cell (MLC) NAND flash or another type of media with multiple levels, states, and/or abodes, a set of configuration parameters may describe one or more storage thresholds for the storage cells, such as read voltage thresholds, resistivity thresholds (e.g., for PCM), or the like. In an embodiment of a non-volatile memory element 123 that includes a non-volatile memory medium with many storage cells, one or more sets of configuration parameters may describe one or more storage thresholds for each of the storage cells, or the like.

As used herein, a configuration parameter for a set of storage cells or other non-volatile memory media 122 is a parameter that is modifiable by way of an interface. In one embodiment, a configuration parameter is modifiable by storing a value for the configuration parameter in a control register or other memory buffer of a non-volatile memory element 123. The interface may comprise a publicly known interface or a proprietary interface and may include use of particular command instructions and/or use of particular parameters, register settings, driver settings, controller settings, a particular set of command instruction sequences, or other differences from regular commands (general purpose commands) or settings used to interface with or manage the set of storage cells.

Configuration parameters may relate to writing/programming storage cells, reading from storage cells, erasing storage cells, managing storage cells, device driver or storage/memory controller settings for storage cells, or the like. A configuration parameter for a set of storage cells may be associated with a device driver for the non-volatile memory device 120, with a non-volatile memory controller 124, or the like, and may relate to how the device driver and/or non-volatile memory controller 124 use, manage, or interact with the set of storage cells and/or the non-volatile memory media 122.

A configuration parameter, in certain embodiments, may include one or more storage thresholds, such as a read voltage threshold, a resistivity threshold, a programming threshold, an erase threshold, a hardware driver level threshold, a storage controller level threshold, or the like. The configuration parameter may be set once during initialization of the non-volatile memory media 122, dynamically with each command issued to the non-volatile memory media 122, or during operation of the non-volatile memory media 122 in response to triggers such as events or time intervals. The non-volatile memory controller 124, in one embodiment, proactively sets one or more configuration parameters for storage cells of the non-volatile memory media 122 to manage the non-volatile memory media 122, to reduce errors, or the like.

One embodiment of a configuration parameter for reading from storage cells is a read threshold such as a read voltage threshold, a resistivity threshold, or the like. Other embodiments of configuration parameters for reading from storage cells may include whether to perform a read retry in response to an error, whether to adjust a read threshold or other configuration parameter prior to a read retry, or the like. For example, the non-volatile memory controller 124 may determine a number of read retries to perform, a maximum number of read retries, configuration parameters for each read retry, or the like based on discovered or monitored media characteristics, media characteristics from a vendor or manufacturer, or the like.

Various embodiments of configuration parameters for writing/programming storage cells may include a step magnitude for an incremental step pulse programming operation, a maximum number of iterations for an incremental step pulse programming operation, a program verify threshold for a program operation, an initial bias for an incremental step pulse programming operation, a duration for an incremental step pulse programming operation, or the like. A configuration parameter for erasing storage cells, in certain embodiments, may include a step magnitude for an incremental step pulse erase operation, a maximum number of iterations for an incremental step pulse erase operation, an erase verify threshold for an erase operation, an initial bias for an incremental step pulse erase operation, a duration for an incremental step pulse erase operation, or the like.

For SLC storage cells that store a single binary value, the read voltage threshold is the boundary between a binary one state and a binary zero state. For example, in one embodiment, a storage cell with a read voltage level above the read voltage threshold stores a binary one while a storage cell with a read voltage level below the read voltage threshold stores a binary zero. Other types of storage cells, such as MLC storage cells, may have multiple read voltage thresholds, to distinguish between more than two discrete states.

For example, in one embodiment, MLC storage cells that store two bits may have three read voltage thresholds, separating binary values of 11, 01, 00, and 10. The three example read voltage thresholds may be x volts, y volts, and z volts, described in greater detail below with regard to the read voltage thresholds 1062 of FIGS. 10A and 10B. If the voltage read from a storage cell falls between Vmin and x volts, a binary 11 state is indicated. In certain embodiments, Vmin may be a negative voltage. If the voltage read from a storage cell falls between x volts and y volts, a binary 01 state is indicated. If the voltage read from a storage cell falls between y volts and z volts, a binary 00 state is indicated. If the voltage read from a storage cell falls between z volts and Vmax volts, a binary 10 state is indicated.

The voltages for Vmin, Vmax, x, y, z may vary based on the manufacturer of the storage cells. Read voltages, for example, may range between −3.5 and 5.8 volts, or between another predefined range of voltages. Similarly, the order of binary state changes 11, 01, 00, and 10 relative to read voltage thresholds may vary based on the encoding type used, such as a Gray code encoding type, a binary code encoding type, or the like. One example encoding type is described below with regard to FIGS. 10A and 10B. As described in greater detail with regard to FIGS. 10A and 10B, although a single MLC storage cell stores multiple bits, bits from a single storage cell may not have adjacent addresses, and may be included in different physical pages, logical pages, or the like. Accordingly, in various embodiments, the non-volatile memory controller 124 may manage configuration parameters, such as read voltage thresholds or other storage thresholds, at various granularities, such as per abode/storage state, per page (logical or physical), per erase block (logical or physical), per set of pages, per error correcting code (ECC) chunk/codeword, per wordline, per chip, per die, per die plane, or the like.

In certain embodiments, instead of referring to a boundary between discrete values, a read voltage threshold comprises a range of voltages (a maximum and a minimum) that indicate a value. A voltage threshold that is a range can be adjusted by changing the boundary at either end, or at both ends, of the range. The read voltage thresholds or other configuration parameters for the non-volatile memory media 122, in one embodiment, are initially set at a default level that may be defined by a manufacturer. Often such configuration parameter default levels are set to accommodate a large range of general purpose uses of the non-volatile memory media 122. Advantageously, embodiments of the non-volatile memory controller 124 allow the non-volatile memory media 122 to be used most optimally based on more specific use characteristics.

The non-volatile memory controller 124, in certain embodiments, overrides the default level for one or more configuration parameters, setting the one or more configuration parameters to a different level based on media characteristics of the non-volatile memory media 122. The non-volatile memory controller 124 may set the configuration parameters to a level that decreases the amount of errors that the non-volatile memory media 122 encounters when compared to the default level, to a level that increases the amount of errors that may be detected and corrected when compared to the default level, to a level that increases the number of input/output operations per second (IOPS) of the non-volatile memory media 122 when compared to the default level, to a level that increases the usable life of the non-volatile memory media 122 when compared to the default level, and/or that otherwise improves the utility of the non-volatile memory media 122 when compared to the default level.

Certain types or models of non-volatile memory media 122 may mandate or require certain timing or delays between setting configuration parameters for one or more storage cells (e.g., a non-volatile memory element 123 or portion thereof) of the non-volatile memory media 122. For example, for certain types of MLC NAND flash non-volatile memory elements 123, to set or change a configuration parameter or feature for a storage operation, a non-volatile memory media controller 126 may be required to set a first configuration parameter (e.g., a first read voltage threshold x) by writing the first configuration parameter to a predefined control register of the non-volatile memory element 123, wait a predefined amount of time (e.g., a tFEAT delay or the like), set a second configuration parameter (e.g., a second read voltage threshold y) by writing the second configuration parameter to the predefined control register of the non-volatile memory element 123, wait a predefined amount of time, and so forth until each of the configuration parameters have been set. Similar delays may be enforced between sets of configuration parameters for different storage operations.

As described in greater detail below, in certain embodiments, the non-volatile memory device 120, each non-volatile memory element 123, or the like, may include multiple control registers or other memory buffers to create a cache or pipeline for configuration parameters, thereby minimizing, masking, hiding, and/or eliminating transfer timing delays. For example, instead of requiring separate delays between writing configuration settings (e.g., three or four different read voltage thresholds or the like with three or four tFEAT delays), by caching and/or pipelining configuration parameters, the non-volatile memory elements 123 may reduce the delays to a single delay (e.g., a single tFEAT or the like).

The non-volatile memory controller 124 may base a configuration parameter on one or more media characteristics by entering the one or more media characteristics into an equation, into a mathematical model, into a lookup table (LUT), into a matrix, or the like; by performing a predefined transform or operation on the one or more media characteristics; or by otherwise referencing and/or manipulating the one or more media characteristics to determine the configuration parameter. A configuration parameter equation, mathematical model, LUT, matrix, or the like may be based on empirical data, such as test data, historical data, and the like. A design engineer or the like, in one embodiment, may test sets of storage cells with various media characteristics, such as non-volatile memory media from various manufacturers or the like, and determine optimal configuration parameters for storage cells with the various media characteristics. For example, an equation, mathematical model, LUT, matrix, or the like may indicate that non-volatile memory media 122 from manufacturer X tends to have Y amount of natural drift in cell values after 1,000 program/erase cycles such that a read threshold can be increased by Z volts to compensate, or the like.

In other embodiments, the non-volatile memory controller 124 may dynamically determine a configuration parameter; an equation, mathematical model, LUT, matrix, transform, or the like to define a configuration parameter; an adjustment to a configuration parameter; or the like during operation of the non-volatile memory device 120. For example, the non-volatile memory controller 124 may determine configuration parameters for various media characteristics initially based on trial and error, based on a direction of an error (e.g., from a binary one to a binary zero or vice versa), or the like and may autonomously correlate the effectiveness of the configuration parameter, based on a change in an error rate such as a raw bit error rate (RBER), an uncorrectable bit error rate (UBER), or the like, to determine an equation, mathematical model, LUT, matrix, transform, or the like for determining subsequent configuration parameters and/or configuration parameter adjustments.

A media characteristic is a statistic, heuristic, mathematical model, transform, or other descriptor associated with an attribute of the non-volatile memory media 122. A media characteristic for a set of storage cells may be substantially static or may be dynamic and change over time.

In one embodiment, a media characteristic includes or relates to a static characteristic such as a make, a model, a version, a manufacturer, a product version, a lot number, or the like for the non-volatile memory device 120 and/or for the non-volatile memory media 122. In another embodiment, a media characteristic describes a dynamic attribute or statistic for a set of particular storage cells, such as a program/erase cycle count for the set of storage cells, a read count for the set of storage cells, a retention time since a previous write for the set of storage cells, a dwell time for the set of storage cells such as a logical or physical erase block (e.g., a time between a program of an erase block and an erase of the erase block), an average of multiple previous dwell times for the set of storage cells, an error statistic for the set of storage cells, or the like. A media characteristic, in a further embodiment, may include or relate to an environmental condition or a use of the non-volatile memory device 120 and/or of the non-volatile memory media 122, such as a temperature, a use case (e.g., a cache use case, an archival use case, a server use case, an enterprise use case, a consumer use case, etc.), or the like.

A media characteristic for a set of storage cells affects or informs the determination of a configuration parameter for the set of storage cells. In one embodiment, the media characteristics include a program/erase cycle count for a set of storage cells. In another embodiment, the media characteristics include a read count for a set of storage cells. The media characteristics, in a further embodiment, include a retention time since a previous write for a set of storage cells. In an additional embodiment, the media characteristics include a temperature for a set of storage cells. The media characteristics, in certain embodiments, include a use case for a set of storage cells. In another embodiment, the media characteristics include an error statistic for a set of storage cells, such as an UBER, a RBER, or the like. In a further embodiment, the media characteristic may include previous or historical configuration parameters for a set of storage cells, configuration parameters or media characteristics for other sets of storage cells, or the like.

Figure 2:
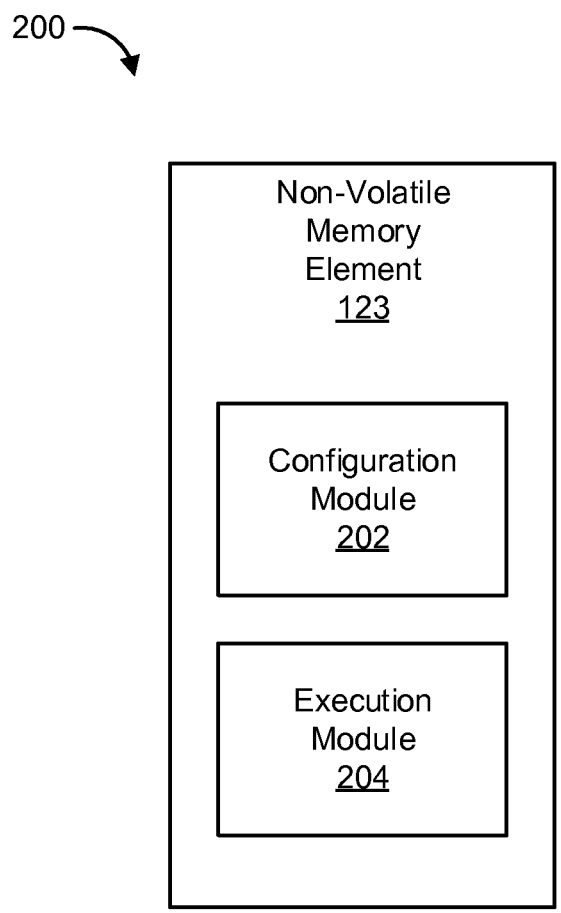
FIG. 2 is a schematic block diagram of an embodiment of a non-volatile memory element.

FIG. 2 depicts one embodiment of a non-volatile memory element 123. The depicted embodiment includes a configuration module 202 and an execution module 204. The configuration module 202 and the execution module 204, in certain embodiments, may be part of an embedded controller or media manager for the non-volatile memory element 123, to manage and/or configure the execution of storage operations for the non-volatile memory element 123. In another embodiment, at least a portion of the configuration module 202 and/or the execution module 204 may be part of the non-volatile memory controller 124 (e.g., part of the SML 130 and/or the non-volatile memory media controller 126). In one embodiment, the configuration module 202 is configured to receive a set of configuration parameters. In another embodiment, the configuration module 202 selects a memory buffer in the non-volatile memory element 123 to store a set a set of configuration parameters for a storage operation on non-volatile memory media 122 of the non-volatile memory element 123. As storage operations are completed, the configuration module 202 may receive other sets of configuration parameters and store them in other memory buffers in order to indicate other storage operations.

The configuration module 202 may manage many memory buffers in the non-volatile memory element 123. The configuration module 202 may use the memory buffers, described in greater detail below with regard to FIG. 4, to store sets of configuration parameters for the memory element 123, settings for the memory element 123, or the like. The configuration module 202 may store received sets of configuration parameters in the memory buffers sequentially, or may use a memory buffer based on a selection by a client. The configuration module 202 may also decide which memory buffers to use based on a prescribed algorithm, pattern, or the like. For example, in the case of two memory buffers, the configuration module 202 may alternate between the two memory buffers for storing configuration parameters and executing storage operations using the configuration parameters. The configuration module 202 may alternate selection of memory buffers automatically, may alternate or select a different memory buffer in response to a selection by a client 116, or may alternate or select a different memory buffer in response to a different trigger event.

In an embodiment that includes more than two memory buffers, the configuration module 202 may choose even numbered memory buffers before odd numbered memory buffers, may choose memory buffers in order, reverse order, may use the memory buffers as a pipeline, or the like. The configuration module 202 may also choose memory buffers randomly and indicate to the execution module 204 which memory buffers stores a set of configuration parameters to use for a storage operation.

In another embodiment, the configuration module 202 may use the memory buffers to form a data pipeline. A data pipeline may be formed by two or more memory buffers. In this embodiment, the configuration module 202 stores sets of configuration parameters in one memory buffer designated as the head or input of the data pipeline. The configuration module 202 may copy or move sets of configuration parameters down the data pipeline through the other memory buffers towards the tail or output of the data pipeline. As sets of configuration parameters arrive at the tail or output of the data pipeline, the execution module 204 may execute operations based on the sets of configuration parameters as described below with regard to the execution module 204.

In another embodiment, the configuration module 202 uses and/or includes a multiplexer to select a memory buffer. In this embodiment, there may be two or more memory buffers selectable by the multiplexer. The configuration module 202 may use a multiplexer to automatically alternate between memory buffers, to proceed through the memory buffers sequentially, randomly, as requested by a client 116, or the like, as previously described.

In another embodiment, the configuration module 202 selects a memory buffer to use in response to a selection by a storage client 116. For example, an operating system, a file system, a database, a device driver, or another storage client 116 may indicate to the configuration module 202 which memory buffer to use. This indication from a storage client 116 may originate from a user a software application executing on the host computing device 110, or the like. In another embodiment, the SML 130, the non-volatile memory controller 124, the non-volatile memory media controller 126, or the like may indicate to the configuration module 202 which memory buffer to use.

In one embodiment, the configuration module 202 may adjust configuration parameters based on media characteristics of the non-volatile memory media 122, as described above. For example, the configuration module 202 may adjust a read voltage threshold for one or more storage cells of the non-volatile memory media 122 in order to compensate for shifts in the read voltage levels of the storage cells. Thereafter, the execution module 204 may perform or execute a storage operation based on the adjusted set of configuration parameters stored in the memory buffers as previously described.

In one embodiment, the configuration module 202 may receive a set of configuration parameters sequentially or one after another, synchronized with a clock on the non-volatile memory device 120 or the like. The configuration module 202 may receive and store parameters from a set of configuration parameters without a required or mandated delay between parameters in the set, without a mandated or required delay between sets of configuration parameters, or the like. In one embodiment, as one configuration parameter or set of configuration parameters is received by the configuration module 202, the configuration module 202 may store (in one write) the configuration parameter or set of configuration parameters in a memory buffer of the non-volatile memory element 123. Further embodiments of a configuration module 202 storing sets of configuration parameters for storage operations are described below with regard to FIGS. 4-6.

In one embodiment, the execution module 204 may be configured to execute storage operations on storage cells of the non-volatile memory element 123 using configuration parameters from the configuration module 202. The execution module 204 may execute a storage operation on a non-volatile memory element 123 while the configuration module 202 receives and/or stores a set of configuration parameters for another storage operation on the same non-volatile memory element 123. For example, where a non-volatile memory element includes two memory buffers, the configuration module 202 may alternate storing sets of configuration parameters between the two memory buffers, and the execution module 204 may alternate between the two memory buffers for executing storage operations. The configuration module 202 may alternate in response to a selection by a client, may alternate automatically, or the like. The execution module 204 may be configured to execute storage operations based on one of the memory buffers while the configuration module 202 stores another set of configuration parameters in the other memory buffer. The configuration module 202 and the execution module 204 may alternate in an opposite or complementary pattern. In this embodiment, the execution module 204 may be configured to execute a storage operation based on one memory buffer after completing a storage operation based on configuration parameters from another memory buffer. This may allow for a more efficient process for executing storage operations on a non-volatile memory element 123 because the execution module 204 does not have to wait for configuration parameters between storage operations or the like.

In another embodiment, the execution module 204 may receive a command from the configuration module 202. The command may include a designation of a memory buffer to use in executing a storage operation. The execution module 204 may execute a storage operation based on a memory buffer indicated by the configuration module 202 containing a set of configuration parameters. The configuration module 202 may set a value in a register or other memory buffer of the non-volatile memory element 123 to indicate to the execution module 204 which memory buffer contains a set of configuration parameters to use for a storage operation.

In one embodiment, the configuration module 202 may use a multiplexer for the execution module 204 to indicate to the execution module 204 which memory buffer to use for execution of a storage operation. In a further embodiment, the configuration module 202 and the execution module 204 may both select memory buffers and/or sets of configuration parameters based on a predefined pattern or order. In response to the configuration module 202 indicating to the execution module 204 to use a specified memory buffer and/or a set of one or more configuration parameters, the execution module 204 may execute or perform a storage operation based on the set of configuration parameters in the specified memory buffer. In response to completing the storage operation, the execution module 204, in certain embodiments, may clear the memory buffer storing the configuration parameters used for the storage operation, the configuration module 202 may overwrite the memory buffer or allow the memory buffer to be overwritten, or the like. Further embodiments relating to an execution module 204 are described below with regard to FIGS. 4, 5, and 8.

As described above, when setting configuration parameters for certain types of NAND flash non-volatile memory elements 123, a mandatory delay may be required to set each configuration parameter, such as a read voltage threshold Vt or the like. This delay (e.g., tFEAT), when aggregated for multiple configuration parameters, may be add up to 500 nanoseconds (ns), 1 microsecond (μs), or more for each parameter. In an embodiment where a set of configuration parameters includes four parameters, with a mandated or required delay between each configuration parameter, writing the set of configuration parameters to the non-volatile memory element 123 may add up to 2 μs, up to 4 μs, or the like to execution of a storage operation.

In one embodiment of a non-volatile memory element 123, such as a NAND flash chip, die, die plane, or the like, the non-volatile memory element 123 may include a plurality of registers for storing configuration parameters. For example, four registers or the like may be used to store one set of configuration parameters, a single register may be configured to store multiple configuration parameters, or the like. One or more additional registers (e.g., one register, two registers, three registers, four registers, five registers, or the like) may be used to store another set of configuration parameters. The first one or more registers may store read voltage thresholds corresponding to different read voltage thresholds. In response to the first one or more registers storing the read voltage thresholds, the execution module 204 may begin to perform a read operation on the non-volatile memory element 123 based on the stored read voltage thresholds.

During execution of the storage operation using the stored read voltage thresholds, the non-volatile memory controller 124 may store a new set of read voltage thresholds to the second set of one or more registers. In this embodiment, the execution module 204 may begin another storage operation using the second set of read voltage thresholds in the second set of registers. In one embodiment, the execution module 204 may scan the registers to determine which set contains a valid set of configuration parameters. In another embodiment, the execution module 204 may respond to a command or request from the configuration module 202 as described above.

In another embodiment, an indicator register may store an integer, a pointer, or other identifier to indicate to the execution module 204 which memory buffer or register set to use for a current storage operation, may indicate a memory buffer or register set to use for a subsequent storage operation, or the like. In one embodiment, a non-volatile memory element 123 and/or the configuration module 202 may indicate to the non-volatile memory controller 124 (e.g., the non-volatile memory media controller 126, the SML 130, or the like) which memory buffer or register to write configuration parameters to so that a non-volatile memory controller 124 may know where to write sets of configuration parameters for each storage operation, while the execution module 204 is executing a storage operation based on another set of configuration parameters or the like.

In another embodiment, the configuration module 202 may transparently alternate memory buffers to cache, buffer, and/or pipeline configuration parameters, without the non-volatile memory controller 124 performing different actions for different storage requests. For example, the configuration module 202 may accept sets of configuration parameters as part of a storage request, at a same predefined address, or the like for each storage operation, and may use a multiplexer or otherwise direct the configuration parameters to different memory buffers, without knowledge of the non-volatile memory controller 124, a storage client 116, or the like.

Figure 3:
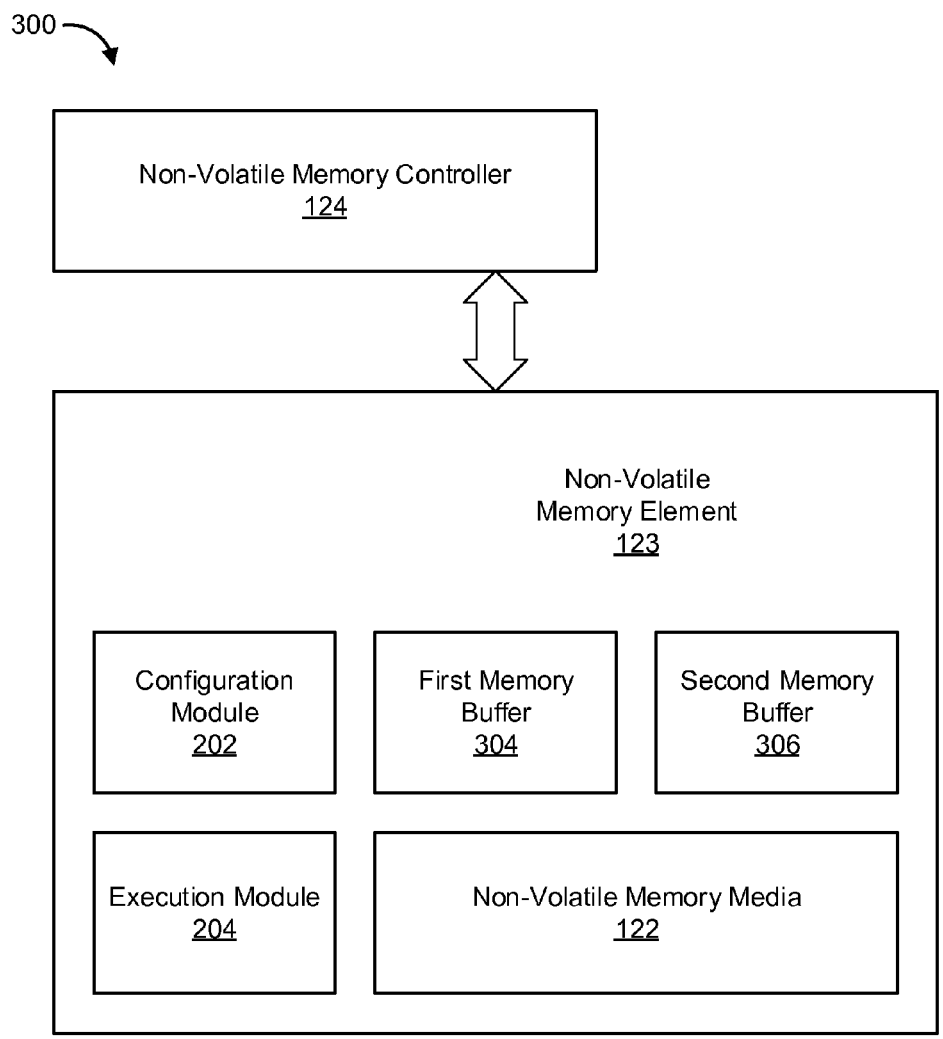
FIG. 3 is a schematic block diagram illustrating one embodiment of a non-volatile memory element with a controller.

FIG. 3 depicts one embodiment 300 of a non-volatile memory element 123 and a non-volatile memory controller 124. As previously described, a non-volatile memory controller 124 may be configured to communicatively couple the host computing device 110 to the non-volatile memory device 120, to manage the non-volatile memory device 120, to receive and service storage requests from storage clients 116, or the like. In response to a request by a client 116, or the like, a non-volatile memory controller 124 may generate a set of configuration parameters for a storage operation on one or more non-volatile memory elements 123.

In one embodiment, a non-volatile memory element 123 includes a configuration module 202, an execution module 204, two memory buffers 304, 306, and non-volatile memory media 122. In one embodiment, the non-volatile memory element 123 may comprise an integrated circuit chip, die, die plane, or the like. In certain embodiments, a chip may include multiple dies, and the memory element 123 may comprise one of the dies of the chip. In another embodiment, an integrated circuit die may include multiple planes, and the memory element 123 may comprise one of the die planes. In other embodiments, the modules 202, 204, buffers 304, 306, and/or media 122 of the memory element 123 may be included or co-located on a chip, die, and/or die plane.

In another embodiment, the non-volatile memory element 123 may include a processor or controller, memory, timers, interfaces to external devices, or the like. A processor may include a microcontroller, microprocessor, digital signal processor (DSP), or the like. In an embodiment where the non-volatile memory element 123 comprises a chip, package, die, die plane, or the like, as described above, the configuration module 202, the execution module 204, the memory buffers 304,306, and/or other components of the memory element 123 may be co-located on the chip, package, die, die-plane, or the like.

In one embodiment, a non-volatile memory controller 124 may be configured to request a read operation, a write operation, an erase operation, a trim operation, or another storage operation from the non-volatile memory element 123. For example, a non-volatile memory controller 124 may generate a set of configuration parameters for the read operation or other storage operation. The set of configuration parameters may include a plurality of read voltage thresholds for storage cells of the non-volatile memory media 122 or the like.

In one embodiment, the configuration module 202 is configured to receive a set of configuration parameters and store the set of configuration parameters in the first memory buffer 304. The configuration module 202 may indicate to the execution module 204 that the first memory buffer 304 contains a set of configuration parameters for a storage operation on the non-volatile memory media 122. The execution module 204 may read the configuration parameters from the first memory buffer 304 and execute the storage operation on the non-volatile memory media 122 according to the set of configuration parameters. For a read operation, the execution module 204 may communicate the read data to the non-volatile memory controller 124, or the like.

In another embodiment, the configuration module 202 may be configured to receive two sets of configuration parameters. The configuration module 202 may store the first set of configuration parameters in the first memory buffer 304 and may indicate to the execution module 204 that the first memory buffer 304 contains a set of configuration parameters for a storage operation on the non-volatile memory element 122. For example, the configuration module 202 may indicate to the execution module 204 by setting an indicator in a memory buffer or in a register of the non-volatile memory element, sending a signal to the execution module 204, selecting an input and/or output of a multiplexer, or the like.

The configuration module 202 may store a second set of configuration parameters in the second memory buffer 306 while the execution module 204 is executing a storage operation on the non-volatile memory media 122 of the non-volatile memory element 123 using the first memory buffer 304. In response to completing the storage operation based on the set of configuration parameters in the first memory buffer 304, the execution module 204 may execute a storage operation based on configuration parameters in the second memory buffer 306 without waiting for the configuration module 202 to write another set of configuration parameters (e.g., the configuration module 202 may have already written a set of configuration parameters to the second memory buffer 306 while the execution module 204 was executing the storage operation based on the first memory buffer 304).

In another embodiment, the execution module 204 may detect when a set of configuration parameters has been written to the first memory buffer 304 or the second memory buffer 306 and may perform storage operations on the non-volatile memory media 122 based on the set of configuration parameters in the memory buffer 304,306. For example, the execution module 204 may read the set of parameters and may determine that an indicator in the set of configuration parameters indicates that the set is set of configuration parameters is complete, or the like.

Figure 4:
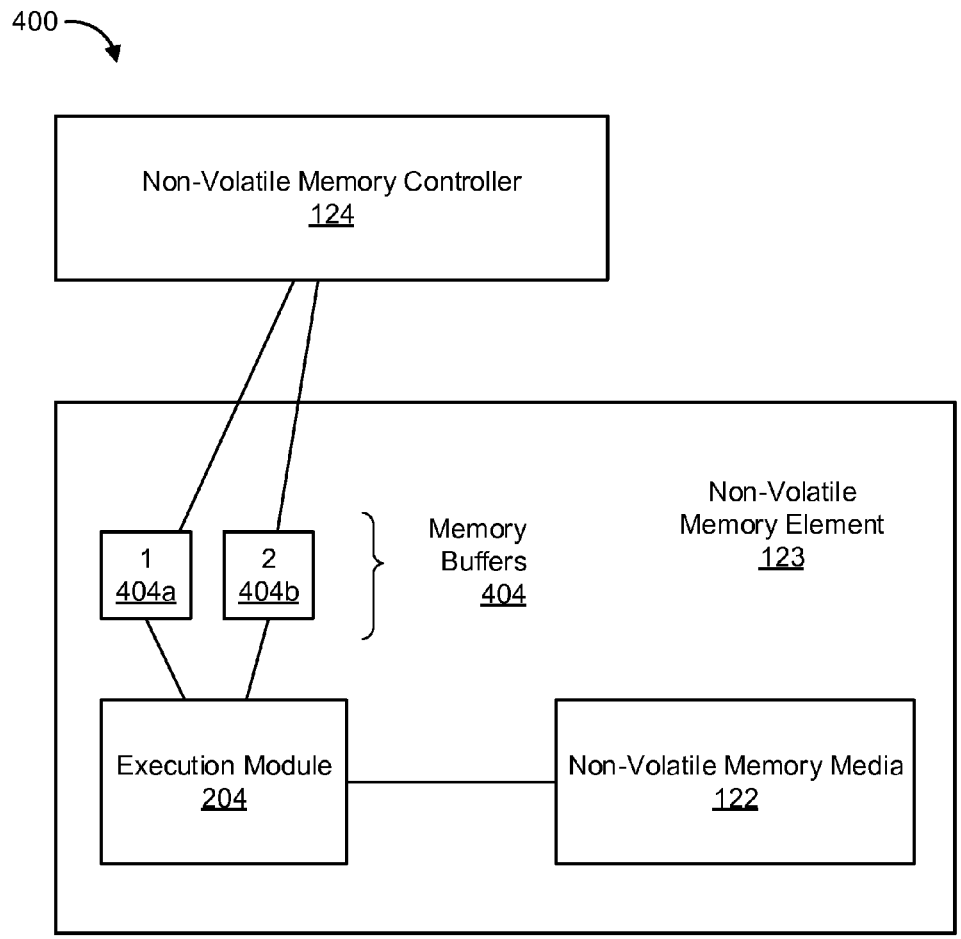
FIG. 4 is a schematic block diagram illustrating another embodiment of a non-volatile memory element with a controller.

FIG. 4 depicts another embodiment 400 of a non-volatile memory element 123 and a non-volatile memory controller 124. The non-volatile memory controller 124, the execution module 204 and the non-volatile memory media 122 may be substantially similar to those described above with regard to FIG. 3. In this embodiment, the non-volatile memory element 123 is without a configuration module 202. In this embodiment, the non-volatile memory controller 124 may write a set of configuration parameters to either the first memory buffer 404a, to a second memory buffer 404b directly, without the management or intervention of a configuration module 202. As described above, the execution module 204 may detect when a set of configuration parameters have been written to one of the memory buffers 404, may receive a command, a request, or signal from the non-volatile memory controller 124, or the like and may execute storage operations based on the set of configuration parameters.

In one embodiment, instead of or in addition to a predefined signal or command, a set of configuration parameters may include a flag or other indicator indicating to the execution module 204 that the set of configuration parameters is completely written to the memory buffer 404, that a storage operation is to be executed, or the like. The execution module 204 may not execute a storage operation on the non-volatile memory medium 122 until after this flag or indicator is read in the memory buffer 404.

In one embodiment, the non-volatile memory controller 124 may be configured to write sets of configuration parameters in one of the memory buffers 404 according to a predefined algorithm, order, pattern, or the like. For example, the non-volatile memory controller 124 may alternate between the first memory buffer 404a and the second memory buffer 404b. In another example, the non-volatile memory controller 124 may write to the first memory buffer 404a but may only write to the second memory buffer 404b if the first memory buffer 404a already stores a set of configuration parameters or is otherwise unavailable. In another example, the non-volatile memory controller 124 may select the first memory buffer 404a or the second memory buffer 404b itself, as a client of the non-volatile memory element 123. In other embodiments, the non-volatile memory element 123 may include more than two memory buffers 404a, 404b, and the non-volatile memory controller 124 may store sets of configuration parameters in the array of memory buffers 404a, 404b sequentially, in a pipeline, or the like.

Figure 5:
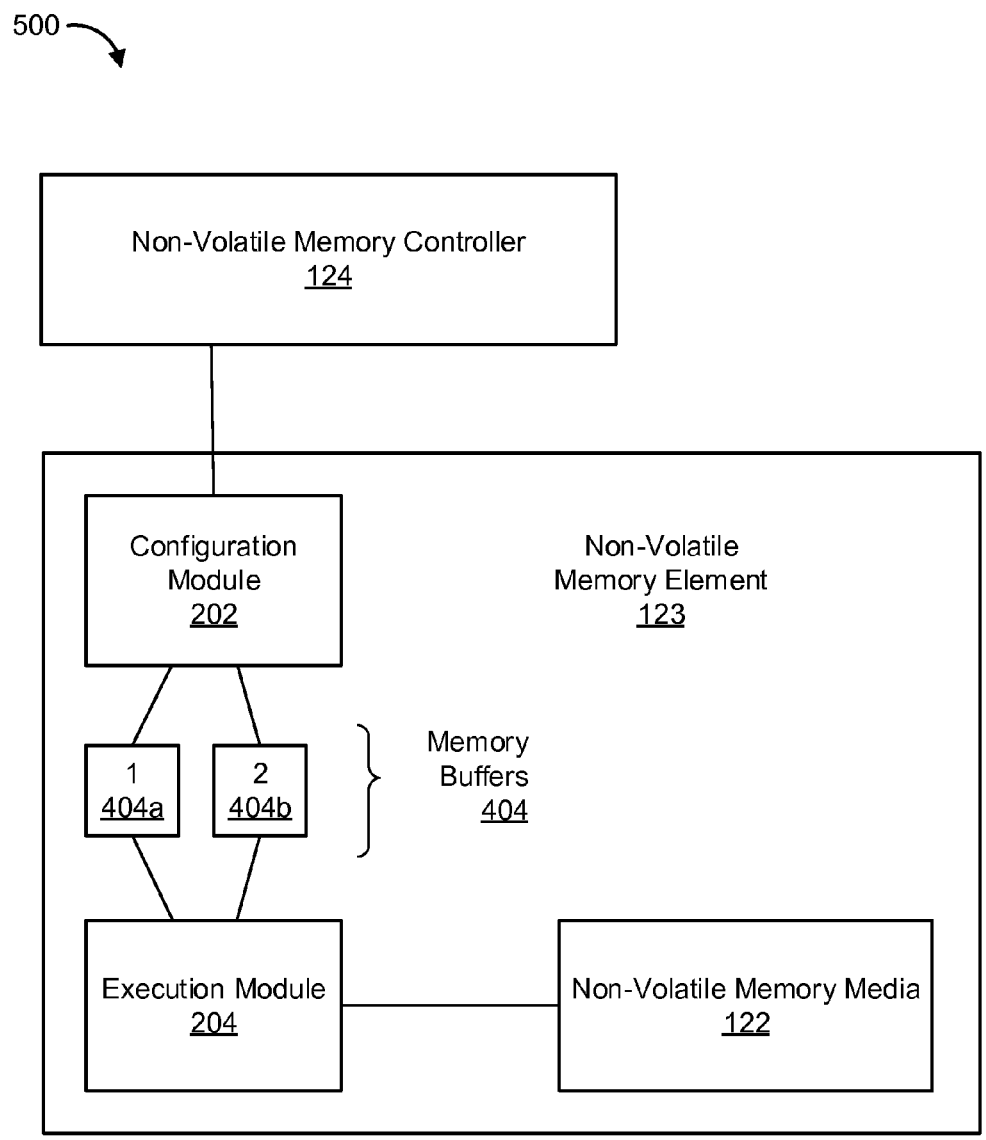
FIG. 5 is a schematic block diagram illustrating one embodiment of a non-volatile memory element including a configuration module.

FIG. 5 depicts one embodiment 500 of a non-volatile memory element 123 including a configuration module 202 and two memory buffers 404. The non-volatile memory element 123 may be substantially similar to the non-volatile memory element 123 described above with regard to FIG. 3. In this embodiment, as previously described, a non-volatile memory controller 124 may be configured to transmit or otherwise send a set of configuration parameters to a configuration module 202.

As characteristics of a non-volatile memory media 122 change over time, the non-volatile memory controller 124 may be configured to adjust a set of configuration parameters based on one or more media characteristics of the non-volatile memory media 122, as described above. The non-volatile memory controller 124, in one embodiment, adjusts a read voltage threshold or other configuration parameter for one or more storage cells from the non-volatile memory media 122 to compensate for shifts in the read voltage levels of the storage cells over time. By proactively and/or dynamically adjusting read voltage thresholds, the non-volatile memory controller 124 may increase the retention time and/or the reliability of data stored in the non-volatile memory media 110, extend a useable lifetime of the non-volatile memory media 122, or the like.

The non-volatile memory controller 124 and/or the configuration module 202 may store an adjusted set of configuration parameters in one of the memory buffers 404 as previously described. The execution module 204 may execute a storage operation based on the adjusted set of configuration parameters stored in the memory buffers 404 as previously described.

In certain embodiments, the configuration module 202 may be configured to receive a plurality of sets of configuration parameters. For example, the non-volatile memory controller 124 may generate sets of configuration parameters for three, four, or more storage operations (one set for each storage operation or the like). In this embodiment, the configuration module 202 may initially receive two sets of configuration parameters. The configuration module 202 may store the first set of configuration parameters in a first memory buffer 404a. The configuration module 202 may then store the second set of configuration parameters in a second memory buffer 404b while the execution module 204 execute the storage operation using the first memory buffer 404a.

In response to completion of the storage operation based on the first memory buffer 404a, the execution module 204 may execute another storage operation for the second set of configuration parameters stored in the second memory buffer 404b. While the execution module 204 is executing that storage operation, the configuration module 202 may store a third set of configuration parameters in the first memory buffer 404a. In response to the execution module 204 completing the storage operation based on the second set of configuration parameters stored in the second memory buffer 404b, the execution module 204 may execute another storage operation based on the third set of configuration parameters stored in the first memory buffer 404a while the configuration module 202 stores a fourth set of configuration parameters in the second memory buffer 404b. In response to the execution module 204 completing the storage operation using the third set of configuration parameters stored in the first memory buffer 404a, the execution module 204 may execute the fourth storage operation based on the fourth set of configuration parameters stored in the second memory buffer 404b.

In one embodiment, the configuration module 202 and the execution module 204 may alternate between different memory buffers 404 so that they do not conflict with each other, but so that the execution module 204 may execute storage operations based on sets of configuration parameters without waiting for the configuration module 202 to store sets of configuration parameters between storage operations. The configuration module 202 and the execution module 204 may continue to operate according to this method to receive more sets of configuration parameters and perform corresponding storage operations for the received sets. Further description regarding this alternating buffer process is described below with regard to FIG. 8.

In another embodiment, the configuration module 202 may manage the memory buffers 404 to form a data pipeline. For example, the non-volatile memory controller 124 may generate three sets of configuration parameters for three storage operations on the non-volatile memory element 123. In this example, the configuration module 202 may be configured to receive and store the first set of configuration parameters in the first memory buffer 404a. The configuration module 202, in certain embodiments, may be configured to receive a set of configuration parameters asynchronously. As used herein, writing configuration parameters "asynchronously" indicates that the configuration parameters are written without a mandated or required delay between the configuration parameters. Writing asynchronously may mean writing a set of configuration parameters in a single operation (there being no significant delay between configuration parameters of the set). The depicted embodiments of a non-volatile memory element 123 may provide for receiving a set of configuration parameters asynchronously, allowing the non-volatile memory controller 124 to write the configuration parameters opportunistically, by having memory buffers 404 available to receive the set of configuration parameters.

In response to a set of configuration parameters being written to the first memory buffer 404a, the execution module 204 may detect a completed set of configuration parameters. As previously described, the execution module 204 may move the set of configuration parameters to the second memory buffer 404b and begin the storage operation for the set, in a pipeline configuration. During execution of the storage operation, the configuration module 202 may write the second set of configuration parameters to the first memory buffer 404a. In response to the execution module 204 completing execution of the storage operation for the first set of configuration parameters, the execution module 204 may move the second set of configuration parameters from the first memory buffer 404a to the second memory buffer 404b and begin another storage operation based on the second set of configuration parameters now stored in the second memory buffer 404b. During execution of the second storage operation, the configuration module 202 may write the third set of configuration parameters to the first memory buffer 404a. As described above, the execution module 204 may move the third set stored in the first memory buffer 404a to the second memory buffer 404b after completing the previous storage operation and begin the third storage operation.

In one embodiment, the configuration module 202 and the execution module 204 may operate the first and second memory buffers 104 as a data pipeline, to move configuration parameters through the pipeline so that they do not conflict with each other (e.g., read or write to a memory buffer 404 at similar times), but so that the execution module 204 may execute storage operations based on sets of configuration parameters without waiting for the configuration module 202 to store sets of configuration parameters between storage operations. In certain embodiments, there may be a small delay between storage operations associated with moving the sets of configuration parameters from one memory buffer 404a to another memory buffer or the like 404b, but the impact of this time delay may be minimal. The configuration module 202 and the execution module 204 may continue to operate according to this method to receive more sets of configuration parameters and perform corresponding storage operations for the received sets. Further description regarding a data pipeline buffer process is described below with regard to FIG. 9.

Figure 6:
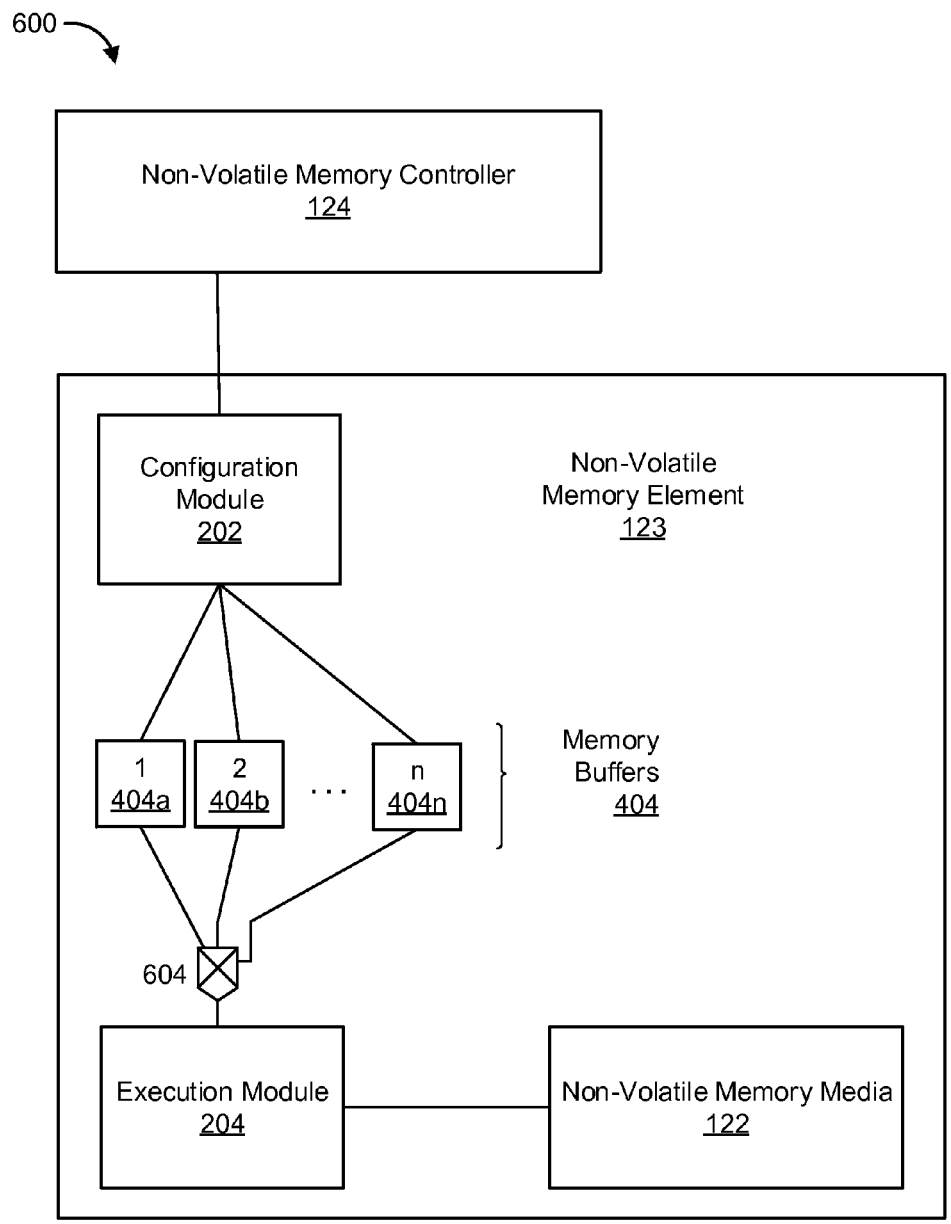
FIG. 6 is a schematic block diagram illustrating one embodiment of a non-volatile memory element including a plurality of memory buffers.

FIG. 6 depicts one embodiment 600 of a non-volatile memory element 123 including a plurality of n memory buffers 404, such as control registers or the like as described above. The non-volatile memory element 123 may be substantially similar to the non-volatile memory element described above with regard to FIG. 5.

In one embodiment, the configuration module 202 is configured to store received sets of configuration parameters sequentially in the memory buffers 404. In this embodiment, the value of n (e.g., the number of memory buffers 404) may be an integer larger than two. In one embodiment, in response to the configuration module 202 storing or writing a first set of configuration parameters, the execution module 204 may execute a storage operation for the written set. Because there are additional memory buffers 404 available, the configuration module 202 may write one or more additional sets of configuration parameters to the memory buffers 404 of the non-volatile memory element 123 during execution of the storage operation. For example, where n=10, the non-volatile memory element 123 may store up to 10 sets of configuration parameters, rotating between the memory buffers 404, using the memory buffers 404 as a pipeline, or the like. In one embodiment, the configuration module 202 may receive up to n sets of configuration parameters from the non-volatile memory controller 124, and may store the sets of configuration parameters in the n memory buffers 404a-n.

In the depicted embodiment, the configuration module 202 may use a multiplexer 604 in order to select a memory buffer 404 for the execution module 204 to use for a storage operation. For example, the configuration module 202 may initially select the first memory buffer 404a indicating to the execution module 204 that the first memory buffer 404a stores a complete set of configuration parameters. The execution module 204 may execute a storage operation based on the set of configuration parameters stored in the first memory buffer 404a. In response to completion of the storage operation based on the set of configuration parameters stored in the first memory buffer 404a, the configuration module 202 may signal the multiplexer 604 to select the second memory buffer 404b. The execution module 204 may execute another storage operation using the second memory buffer 404b in response to the selection by the multiplexer 604. This process may continue until the execution module 204 completes a storage operation based on a set of configuration parameters stored in the nth memory buffer 404n, may repeat beginning with the first memory buffer 404a, or the like.

While the execution module 204 is executing storage operations on the non-volatile memory media 122, the configuration module 202 may simultaneously update memory buffers 404 with other sets of configuration parameters. For example, in response to the execution module 204 completing a storage operation based on a set of configuration parameters in the first memory buffer 404a, the execution module 204 may move to the second memory buffer 404b. The configuration module 202 may have already written n sets of configuration parameters in the n memory buffers, but may continue by writing an additional set of configuration parameters to the first memory buffer 404a. Therefore, the configuration module 202 may continue to write sets of configuration parameters, up to n sets ahead of the execution module 204.

In one embodiment, the configuration module 202 modifies the selection of the multiplexer 604 prior to the execution module 204 completing a storage operation. This allows the execution module 204 to begin another storage operation based on the selected memory buffer 404 without waiting for the configuration module 202 to modify the multiplexer 604. For example, the execution module 204 may read the last parameter in a set of configuration parameters and may proceed to complete a storage operation. In this example, the configuration module 202 may modify the selection of the multiplexer 604 before the execution module 204 completes the storage operation based on the previous memory buffer 404.

In another embodiment, the configuration module 202 writes received sets of configuration parameters according to a prescribed pattern or order and uses a multiplexer 604 to indicate to an execution module 204 which memory buffer 404 contains a set of configuration parameters to use for a storage operation. Various patterns or orders that the configuration module 202 may use include, but are not limited to, ascending order, descending order, alternating order, odd numbered buffers, even numbered buffers, in response to a selection by the non-volatile memory controller 124 or another client, or the like.

In another embodiment, the configuration module 202 and the execution module 204 may use the memory buffers 404 to form a data pipeline, as described above. In a pipeline embodiment, the configuration module 202 may be configured to write sets of configuration parameters to the first memory buffer 404a. The configuration module 202 may be configured to move sets of configuration parameters sequentially through the memory buffers 404 (e.g., in ascending order, in descending order, or the like). In one embodiment, the configuration module 202 may store received sets of configuration parameters sequentially in the memory buffers 404 which may proceed through the sequence or pipeline of memory buffers 404, and the execution module 204 may execute storage operations sequentially based on the received sets of configuration parameters as they reach an end or output of the memory buffers 404.

In response to a set of configuration parameters arriving at the nth memory buffer 404n (e.g., an output buffer), the execution module 204 may execute a storage operation based on the set of configuration parameters in the nth memory buffer 404n. In response to completion of the storage operation, the configuration module 202 may move the sets of configuration parameters through the pipeline until another set of configuration parameters arrives at memory buffer n 404n, and the execution module 204 may execute another storage operation based on the set of configuration parameters in the nth memory buffer 404n. In this manner, the configuration module 202 may write to the first memory buffer 404a (e.g., an input buffer), and the execution module 204 may read configuration parameters from the nth memory buffer 404n (e.g., an output buffer). The configuration module 202 may write n sets of configuration parameters ahead of the execution module 204 performing operations based on the sets of configuration parameters.

Figure 7:
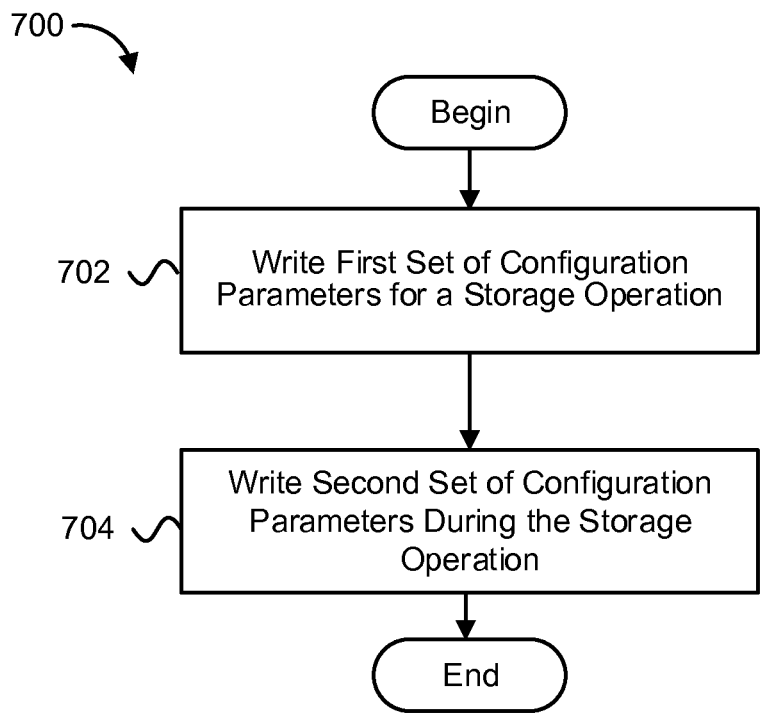
FIG. 7 is a schematic flow chart diagram illustrating one embodiment of a method for managing configuration parameters.

FIG. 7 depicts one embodiment of a method 700 for managing configuration parameters. The method 700 begins and a non-volatile memory controller 124 stores or writes 702 a first set of configuration parameters to a first memory buffer 304 for a storage operation on a non-volatile memory element 123. The non-volatile memory controller 124 writes 704 a second set of configuration parameters to a second memory buffer 306 for a second storage operation on the non-volatile memory element 123 during the storage operation and the method 700 ends.

Figure 8:
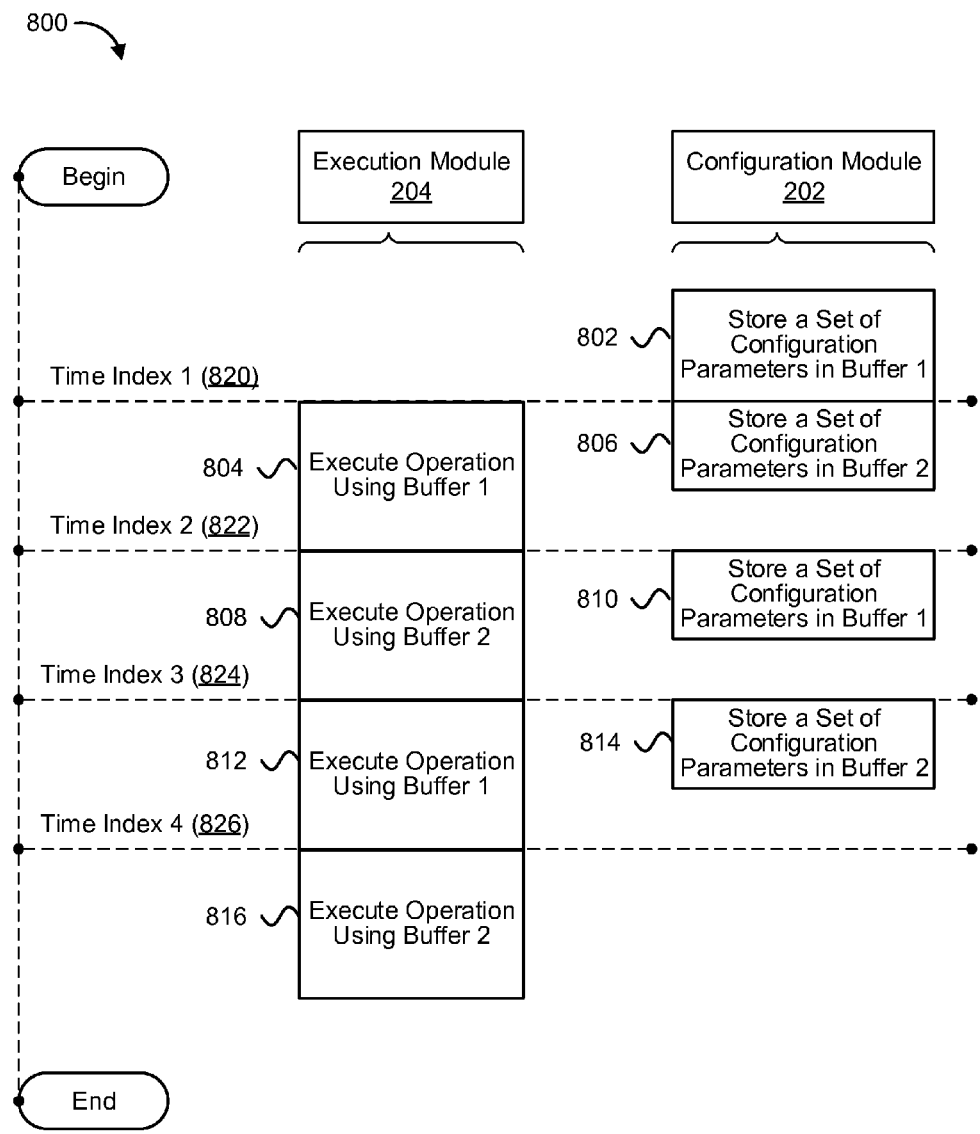
FIG. 8 is a method flow diagram illustrating one embodiment of a method for managing configuration parameters.

FIG. 8 depicts one embodiment of a method 800 for managing configuration parameters. The configuration module 202 and the execution module 204 use two or more memory buffers 404 to manage sets of configuration parameters for storage operations on a non-volatile memory medium 122. As depicted in FIG. 8, the execution module 204 executes 804, 808, 812, 816 operations using either the first memory buffer 404a or the second memory buffer 404b depending on a time index 820, 822, 824, 826 of the method 800. The configuration module 202, in the depicted embodiment, stores 801, 806, 810, 814 sets of configuration parameters in either the first memory buffer 404a or the second memory buffer 404b at various times in the method 800. In the depicted embodiment, the time indexes are in the leftmost column, operations by the execution module 204 are in the middle column, and actions by the configuration module 202 are in rightmost column.

The method 800 begins and the configuration module 202 stores 802 a set of configuration parameters in the first memory buffer 404a. The storing 802 completes at the first time index 820. In response to the storing 802 completing, at the first time index 820, the execution module 204 executes 804 a storage operation using the first memory buffer 404a. Also, at the first time index 820, the configuration module 202 stores 806 another set of configuration parameters in the second memory buffer 404b. In certain embodiments, the configuration module 202 storing 802, 806, 810, 814 sets of configuration parameters may take less time than the execution module 204 takes executing 804, 808, 812, 816 operations on the non-volatile memory media 122. Therefore, the storing 802, 806, 810, 814 by the configuration module 202 may complete before the executing 804, 808, 812, 816 by the execution module 204. The execution module 204 completes execution 804 of the storage operation using the first memory buffer 404a at the second time index 822.

At the second time index 822, the execution module 204 and/or the configuration module 202 may begin additional actions. In the depicted embodiment, the execution module 204 executes 808 of another storage operation using the second memory buffer 404b. The configuration module 202 may concurrently begin storing 810 another set of configuration parameters in the first memory buffer 404a while the execution module 204 executes 808 the current storage operation. The execution module 204 completes execution 808 of the storage operation using the second memory buffer 404b at the third time index 824. In various embodiments, concurrently may include the configuration module 202 and the execution module 204 beginning operations at slightly different intervals so that they do not conflict with each other, or the like. For example, the configuration module 202 may write another set of configuration parameters to the second memory buffer 404b prior to the execution module 204 executing the storage operation based on the set of configuration parameters stored in the first memory buffer 404a or the like. At the third time index 824, the execution module 204 and/or the configuration module 202 may begin additional actions. The execution module 204 may execute 812 another storage operation using the first memory buffer 404a. The configuration module 202 may concurrently begin store 814 another set of configuration parameters in the second memory buffer 404b while the execution module 204 is executing 812 the current storage operation. As described above, the configuration module 202 may complete storing 814 the set of configuration parameters prior to the execution module 204 completing execution 812 of a storage operation using the first memory buffer 404a at the fourth time index 826. The execution module 202 may execute 816 the storage operation using the second memory buffer 404b and the method 800 may end.

In another embodiment, as described above, the configuration module 202 may not wait until the execution module 204 completes execution of a storage operation based on a memory buffer 404 to store another set of configuration parameters in the memory buffer 404, in another memory buffer 404, or the like. The configuration module 202 may begin storing another set of configuration parameters in a memory buffer 404 after the execution module 204 has read the last configuration parameter of the set, but before the execution module 204 has complete the operation for the set, or the like.

Figure 9:
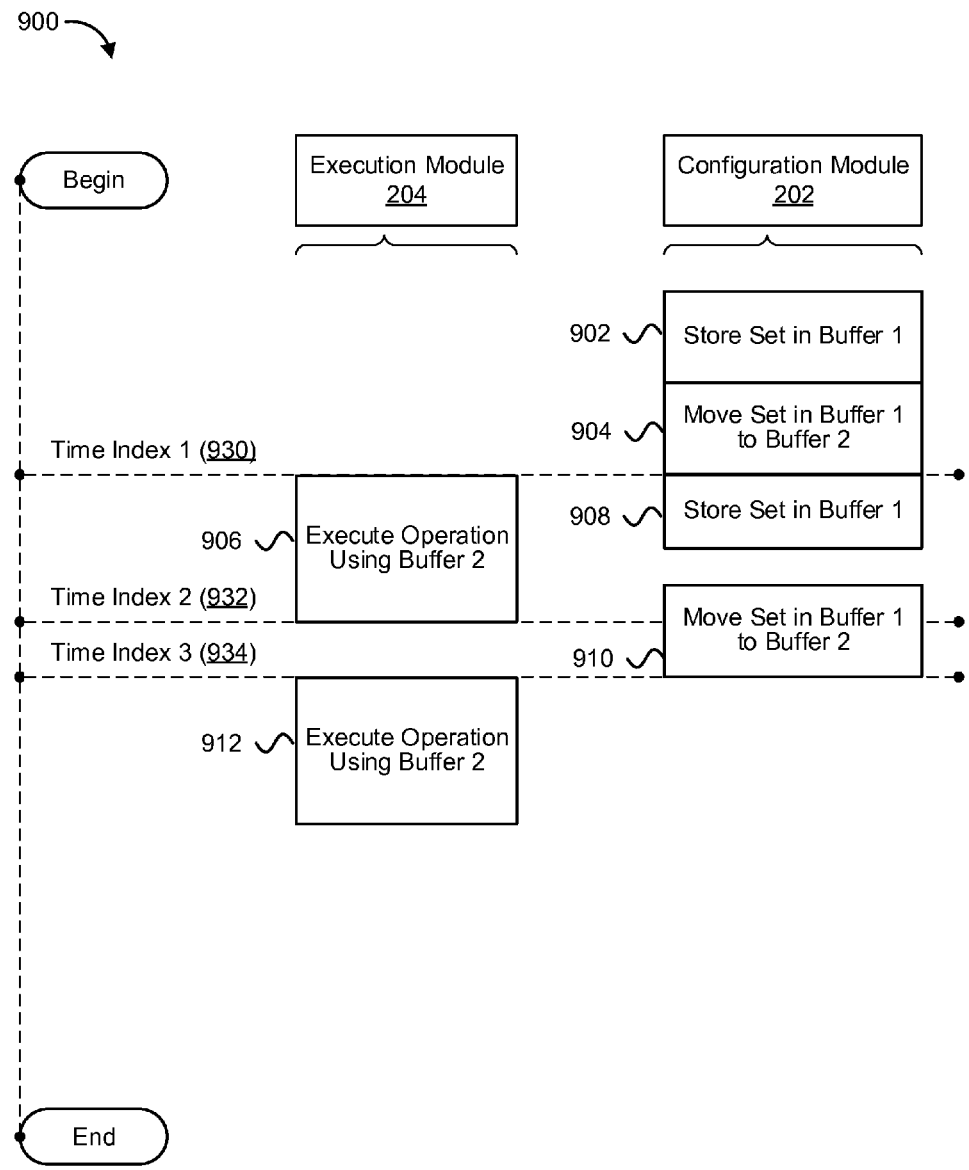
FIG. 9 is a method flow diagram illustrating another embodiment of a method for managing configuration parameters.

FIG. 9 depicts one embodiment of a method 900 for managing configuration parameters. In the depicted embodiment, the configuration module 202 and the execution module 204 use two memory buffers 404 as a data pipeline. In the depicted method 900, the configuration module 202 writes 902, 908 sets of configuration parameters to the first memory buffer 404a (e.g., an input buffer) and moves the configuration parameters down the data pipeline to the second memory buffer 404b (e.g., an output buffer). The execution module 204 executes 906, 912 storage operations based on sets of configuration parameters stored in the second memory buffer 404b (e.g., an output buffer). FIG. 9 illustrates the method 900 as applied to six sets of configuration parameters however, this disclosure is not limited in this regard, and the method 900 may continue for additional sets of configuration parameters. The method 900 begins and the configuration module 202 stores 902 a set of configuration parameters in the first memory buffer 404a, and moves 904 the set of configuration parameters from the first memory buffer 404a to the second memory buffer 404b.

At the first time index 930, the execution module 204 executes 906 a storage operation using the second memory buffer 404b while the configuration module 202 begins storing 908 another set of configuration parameters in the first memory buffer 404a. Prior to the execution module 204 completing execution 906 of the storage operation using the second memory buffer 404b, the configuration module 202 may move the set of configuration parameters from the first memory buffer 404a to the second memory buffer 404b. For example, the configuration module 202 may begin moving the set of configuration parameters after the execution module 204 has read the last configuration parameter for the storage operation, but before the execution module 204 has completed the storage operation, or the like.

After the configuration module 202 moves 910 the set of configuration parameters from the first memory buffer 404a to the second memory buffer 404b (at the third time index 934), as described above, the execution module 204 and/or the configuration module 202 may concurrently begin other actions. At the third time index 934, the execution module 204 executes 912 a storage operation using the second memory buffer 404b while the configuration module 202 stores another set of configuration parameters in the first memory buffer 404a. Prior to the execution module 204 completing execution 912 of the storage operation using the second memory buffer 404b, the configuration module 202 may move the set of configuration parameters from the first memory buffer 404a to the second memory buffer 404b as described above. The method 900 may continue allowing the execution module 204 to execute 906, 912 any number of storage operations based on sets of configuration parameters.

In another embodiment, more than two buffers 404 may be used. In such embodiments, the configuration module 202 may store 902, 908 sets of configuration parameters in the first memory buffer 404a and subsequently move the sets sequentially through the memory buffers 404 until the set arrives at the end (e.g., output) of the data pipeline. In such embodiments, the first memory buffer 404a represents the beginning or input of the data pipeline, and the last buffer (e.g., buffer n) represents the end or output of the data pipeline. The execution module 204 may execute storage operations on the non-volatile memory media 122 based on the last memory buffer 404n, the output, or the end of the data pipeline, as similarly described regarding FIG. 9.

Figure 10A:
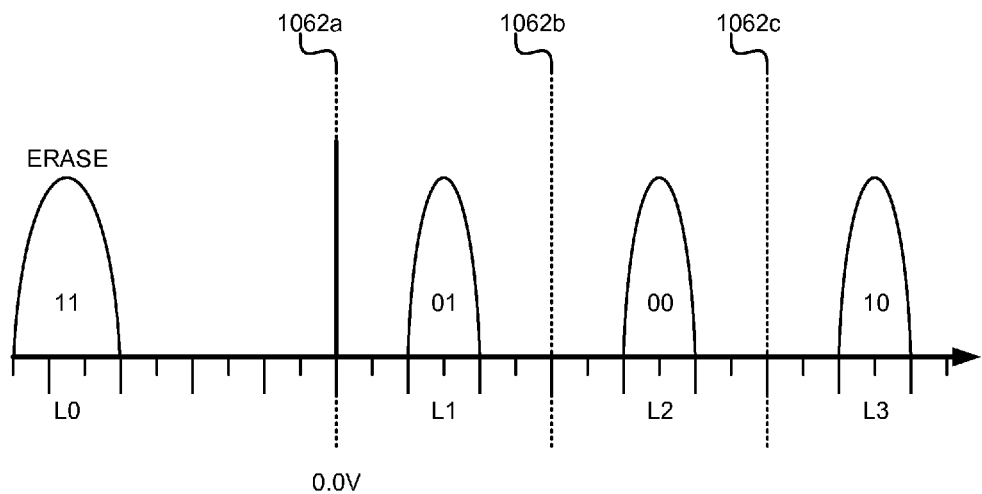
FIG. 10A is a schematic block diagram illustrating one embodiment of configuration parameters for a set of multi-level storage cells of non-volatile memory media.

FIG. 10A depicts one embodiment of configuration parameters 1062a-c for a set of multi-level storage cells, such as MLC NAND flash storage cells, or the like, with an example encoding or programming model. Any limitations inherent in the represented encoding model do not necessarily apply to all other encoding models, and the present disclosure should not be construed as inherently containing any such limitations. The read voltage states, in the depicted embodiment, are encoded using a Gray code encoding model, with binary values for adjacent states differing by a single bit in the encoding.

FIG. 10A shows that the value "11" is associated with the lowest read voltage state (labeled L0, an "erase" state), the value "01" is associated with the next lowest read voltage state (labeled L1), the value "00" is associated with the next highest read voltage state (labeled L2), and the value "10" is associated with the highest read voltage state (labeled L3). In FIG. 10A, the lowest read voltage state L0 is depicted as a negative voltage. Values, magnitudes, sizes, and the like of read voltages may vary by manufacturer and type of non-volatile memory cell, each of which are encompassed by the present disclosure. The configuration parameters 1062, in the depicted embodiment, are read voltage thresholds 1062 that separate states L0, L1, L2, and L3, as described above.

The non-volatile memory controller 124 interprets the four discrete levels of voltage stored in the multi-level storage cell as representing two binary bits one represented by a most significant bit (MSB) in the cell encoding and one represented by a least significant bit (LSB) in the cell encoding. As explained above, other programming and encoding models may be used. Also, certain non-volatile memory media 122 may have more than four possible states, allowing more than two binary values to be stored in a single multi-level storage cell. The voltage levels L0, L1, L2, and L3 may or may not be contiguous; for example, in certain embodiments, the voltage levels are separated by band gaps known as guard band. For example, L0 and L1 may be separated by 0.3V.

In one embodiment, the LSB corresponds to a lower page of data and the MSB corresponds to an upper page of data. In certain embodiments, the multi-level storage cell may adhere to a two-phase programming model, described below, which requires that the LSB be written to before the MSB can be written or vice versa. In another embodiment, the LSB and MSB may be programmed separately by the non-volatile memory controller 124. Such an approach may be taken due to vendor or manufacturer requirements for page pairing (e.g., a LSB bit of MLC cell is paired with an MSB bit of a different MLC cell) and page addressing (e.g., LSB page must be programmed before the MSB page or vice versa). In certain instances, the LSB must be written before the MSB is written, the MSB must be written before the LSB is written, or the like.

In certain embodiments, the non-volatile memory media 122 may employ a two-phase programming model. In such a model, a binary value is first written to the LSB by way of a first write command to the lower page. The write command causes the multi-level storage cell to move from its initial state (for example, a 11 state in L0) to an intermediate state (the lower-to-middle LM state—between L1 and L2) configured such that a 00 state is subsequently read. For example, writing a "0" to the lower page causes the multi-level storage cell to change from the L0 state (where both the LSB and the MSB are 1) to the L2 state (where the LSB is changed to a 0).

A subsequent write of a "0" to the upper page moves the multi-level storage cell from the intermediate state (typically between the L1 state and the L2 state) to L2 state such that both bits of the MLC are "0". Thus, in such an embodiment, two writes (one to the lower page and one to the upper page) are needed to move the multi-level cell from L0 to L2, since the cell transitions through the intermediate state and the MLC device requires that the lower page be programmed before the upper page and does not allow partial programming of a page without an intervening erase operation. Writing a "1" to either of the upper page or lower page will cause the MLC to transition to either L1 or L3 depending on the binary value of the lower page at the time. In addition, certain non-volatile memory media vendors may impose a requirement that the lower page must be written to before the upper page, or the like. In other embodiments, the non-volatile memory media 110 may employ a two-phase programming model where a binary value is first written to the MSB by way of a first write command to the upper page.

In certain embodiments, the non-volatile memory controller 124 may adjust configuration parameters 1062 based on one or more media characteristics of the non-volatile memory media 122. The non-volatile memory controller 124 may determine and manage read voltage thresholds 1062 or other configuration parameters individually for one or more of the abodes L0, L1, L2, L3, determining different settings or adjustments to configuration parameters in different abodes L0, L1, L2, L3. In one embodiment, the non-volatile memory controller 124 adjusts one or more read voltage thresholds 1062 based on a subset of binary data that multi-level storage cells store, such as just an upper page, just a lower page, or the like. In such embodiments, examining the state changes for the LSB bit(s) indicate the direction the voltage in the multi-level storage cell is changing. For both Gray code encoding (as depicted in FIG. 10A) and binary code encoding of bit values, the LSB of a multi-level storage cell transitions between a binary zero and a binary one between the middle two abodes or states, the L1 state and the L2 state in the depicted embodiment.

For other encoding models, the MSB may transition between a binary zero and a binary one between the middle two abodes or states, or the like. For Gray code or binary code encoding models, the LSB has a value of "1" for read voltages in a lower range (including the lower two states or abodes, L0 and L1) and the LSB has a value of "0" for read voltages in an upper range (including the upper two states or abodes, L2 and L3). By using just the LSB of MLC storage cells to determine whether a read bias deviates from a known bias, the non-volatile memory controller 124, in one embodiment, may make the determination in a substantially similar manner to determining whether a read bias for SLC storage cells deviates from a known bias, by counting or tallying binary ones and/or binary zeroes of an LSB data set, or the like.

For certain types of multi-level storage cells, the middle read voltage threshold 1062b and the adjacent L1 and L2 states may be more sensitive to read disturb or other factors that can cause read voltages to drift. Further, in certain embodiments, the LSB and the MSB of a single multi-level storage cell may represent data stored in different physical pages. Using a single bit from each of a plurality of multi-level storage cells as a data set, in one embodiment, may reduce a number of read operations to retrieve the data set. In other embodiments, use of a single bit from each of a plurality of multi-level storage cells in the lower page simplifies a process of detecting a deviation and direction of a read bias from a known bias for multi-level storage cells.

Using each bit stored in multi-level storage cells to determine a read voltage threshold adjustment, in certain embodiments, can increase the accuracy of the read voltage threshold adjustment, but may increase the number of read operations or add complexity to the determination.

Figure 10B:
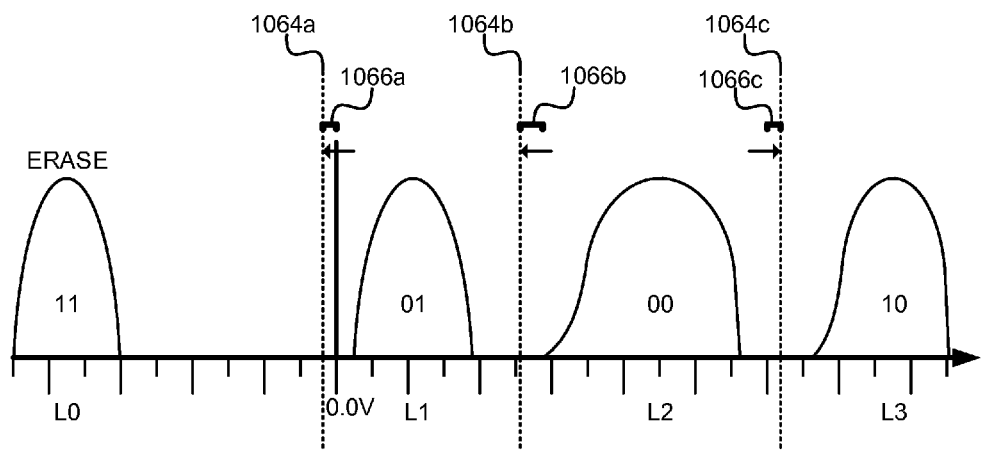
FIG. 10B is a schematic block diagram illustrating one embodiment of adjusted configuration parameters for a set of multi-level storage cells of non-volatile memory media.

FIG. 10B depicts one embodiment of adjusted configuration parameters 1064a-c for a set of multi-level storage cells of non-volatile memory media 122. In certain embodiments, the configuration parameters 1062a-c of FIG. 10B are default configuration parameters, set by a manufacturer, a vendor, or the like and the configuration module 202 may adjust or configure the default configuration parameters 1062a-c to the adjusted configuration parameters 1064a-c. The non-volatile memory controller 124, in one embodiment, determines different adjustments 1066a-c to the default configuration parameters 1062a-c resulting in the different adjusted configuration parameters 1064a-c. In the depicted embodiment, the non-volatile memory controller 124 determines the different adjustments 1066a-c individually for the different abodes L0, L1, L2, L3, with different magnitudes, different directions, and the like, customizing the different adjusted configuration parameters 1064a-c individually to media characteristics of the different abodes L0, L1, L2, L3.

The adjusted configuration parameters 1064a-c more closely match the actual distributions of storage cell states of FIG. 10B than do the default configuration parameters 1062a-c. Were a corresponding set of storage cells to use the default configuration parameters 1062a-c with the distributions of storage cell states of FIG. 10B, the portions of the distributions that have drifted past the locations of the default configuration parameters 1062a-c would register data errors. Similarly, because the charge levels of the different abodes L0, L1, L2, L3 have drifted, leaked, been disturbed, or the like by different amounts and in different directions, using the same adjustment 1064 for each abode L0, L1, L2, L3, in certain embodiments, may register data errors. By configuring the corresponding set of storage cells to use the individually adjusted configuration parameters 1064a-c, the non-volatile memory controller 124 prevent, avoid, or correct the potential data errors.

In one embodiment, the non-volatile memory controller 124 determines the adjusted configuration parameters 1064a-c reactively, as described above. In another embodiment, the non-volatile memory controller 124 determines the adjusted configuration parameters 1064a-c proactively, based on media characteristics for a corresponding set of storage cells.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
storing a first set of configuration parameters for a non-volatile recording device, the first set of configuration parameters configured for a storage operation on a storage element of the non-volatile recording device; and
storing a second set of configuration parameters for the non-volatile recording device during execution of the storage operation on the storage element, the second set of configuration parameters configured for a second storage operation on the storage element of the non-volatile recording device, wherein storing the first and second sets of configuration parameters comprises writing the first and second sets of configuration parameters to an input of a pipeline, the pipeline comprising two or more memory buffers on the non-volatile recording device.

2. The method of claim 1, further comprising writing one or more additional sets of configuration parameters for the storage element to the non-volatile recording device during execution of the storage operation.

3. The method of claim 1, further comprising determining one or more of the first set of configuration parameters and the second set of configuration parameters based on one or more media characteristics of the storage element of the non-volatile recording device.

4. The method of claim 1, further comprising:
selecting a first memory buffer of the non-volatile recording device to store the first set of configuration parameters; and
selecting a second memory buffer of the non-volatile recording device to store the second set of configuration parameters.

5. The method of claim 4, further comprising selecting the first memory buffer of the non-volatile recording device to store a third set of configuration parameters, the first set of configuration parameters no longer being valid, the first set of configuration parameters having been used for the storage operation.

6. The method of claim 1, further comprising alternating between a first and a second memory buffer of the non-volatile recording device for storing additional sets of configuration parameters.

7. The method of claim 1, wherein the first and second sets of configuration parameters are written to control registers on the storage element that includes a non-volatile recording medium.

8. The method of claim 7, wherein the storage element comprises one or more of a chip, a die, and a die plane.

9. The method of claim 1, wherein writing the first set of configuration parameters comprises writing a plurality of configuration parameters asynchronously without a mandated delay between the plurality of configuration parameters.

10. The method of claim 1, wherein the first and second sets of configuration parameters comprise one or more storage thresholds for storage cells of a non-volatile recording medium of the non-volatile recording device.

11. An apparatus comprising:
a first buffer configured to receive configuration parameters for a storage operation on a non-volatile memory element; and
a second buffer configured to receive configuration parameters while the non-volatile memory element is performing the storage operation based on the configuration parameters from the first buffer, the first buffer and the second buffer comprising a pipeline on the non-volatile memory element such that configuration parameters are written to the second buffer and from the second buffer to the first buffer in the pipeline.

12. The apparatus of claim 11, further comprising an integrated circuit die comprising the first buffer and the second buffer.

13. The apparatus of claim 12, the integrated circuit die further comprising:
a configuration module configured to select one of the first buffer and the second buffer; and
an execution module configured to perform storage operations on the non-volatile memory element using configuration parameters stored in the selected buffer.

14. The apparatus of claim 13, wherein the configuration module comprises a cache, the cache configured to store more than two sets of configuration parameters while the execution module is executing storage operations on the non-volatile memory element based on configuration parameters stored in one of the first buffer and the second buffer.

15. The apparatus of claim 13, wherein the configuration module comprises a multiplexer.

16. The apparatus of claim 15, wherein the configuration module is configured to alternate between the first and second buffers by selecting the second buffer using the multiplexer in response to completing the storage operation using the configuration parameters from the first buffer.

17. The apparatus of claim 13, wherein the configuration module is configured to select one of the first buffer and the second buffer in response to a selection by a client.

18. The apparatus of claim 13, wherein the configuration module is configured to receive a set of configuration parameters for an additional storage operation while the execution module is executing the storage operation, the configuration module storing the set of configuration parameters in the selected buffer in response to completing execution of the storage operation.

19. An apparatus comprising:
a non-volatile storage device, the non-volatile storage device comprising,
a non-volatile storage medium;
a first register configured to receive a first read voltage threshold for a storage operation for the non-volatile storage medium; and
a second register configured to receive a second read voltage threshold for the storage operation asynchronously without a predefined delay between receiving the first and second read voltage thresholds; and
a controller for the non-volatile storage device, the controller configured to write the first read voltage threshold to the first register, to write the second read voltage threshold to the second register asynchronously without a predefined delay between writing the first and second read voltage thresholds, and to alternate writing of consecutive read voltage thresholds between the first register and the second register.

20. The apparatus of claim 19, further comprising a host in communication with the non-volatile storage device, the controller comprising a device driver for the non-volatile storage device, the controller executing on the host.

21. A computer program product comprising a non-transitory computer readable storage medium storing computer usable program code executable to perform operations, the operations comprising:
receiving a set of configuration parameters, the set of configuration parameters defining execution of a storage operation on a non-volatile recording device, and the set of configuration parameters comprising a first read voltage threshold;

executing the storage operation on the non-volatile recording device using the set of configuration parameters;

receiving one or more additional sets of configuration parameters during execution of the storage operation on the non-volatile recording device, the one or more additional sets of configuration parameters defining execution of one or more additional storage operations on the non-volatile recording device, and the one or more additional sets of configuration parameters comprising a second read voltage threshold; and alternating storage of consecutively received sets of configuration parameters between a first memory buffer and a second memory buffer.

22. An apparatus comprising:

means for writing a first set of configuration parameters to a non-volatile memory element, the first set of configuration parameters defining a storage operation on the non-volatile memory element, and the first set of configuration parameters comprising a first read voltage threshold;

means for causing the storage operation to be executed on the non-volatile memory element;

means for writing one or more additional sets of configuration parameters to the non-volatile memory element during execution of the storage operation on the non-volatile memory element, the one or more additional sets of configuration parameters defining one or more additional storage operations on the non-volatile memory element, and the one or more additional sets of configuration parameters comprising a second read voltage threshold; and means for alternating storage of consecutively written sets of configuration parameters between a first memory buffer and a second memory buffer.

23. The apparatus of claim 22, further comprising means for writing different configuration parameters within the first set of configuration parameters to the non-volatile memory element asynchronously without a mandated delay between writing the different configuration parameters.

* * * * *